(12) United States Patent
Misumi (10) Patent No.: US 8,575,522 B2
(45) Date of Patent: Nov. 5, 2013

(54) HOT-AIR SUPPLYING DEVICE AND HOT-AIR SUPPLYING METHOD HAVING BYPASS

(75) Inventor: Shuichi Misumi, Kyoto (JP)

(73) Assignee: Omron Corporation, Kyoto (JP)

( * ) Notice: Subject to any disclaimer, the term of this patent is extended or adjusted under 35 U.S.C. 154(b) by 206 days.

(21) Appl. No.: 13/143,970

(22) PCT Filed: Dec. 15, 2009

(86) PCT No.: PCT/JP2009/006870
§ 371 (c)(1),
(2), (4) Date: Jul. 11, 2011

(87) PCT Pub. No.: WO2010/082274
PCT Pub. Date: Jul. 22, 2010

(65) Prior Publication Data
US 2011/0259873 A1  Oct. 27, 2011

(30) Foreign Application Priority Data

Jan. 15, 2009  (JP) .................................. 2009-006915
Oct. 14, 2009  (JP) .................................. 2009-237212

(51) Int. Cl.
*H05B 1/02* (2006.01)
*G05D 23/00* (2006.01)

(52) U.S. Cl.
USPC ............. 219/494; 219/497; 392/307; 165/59; 700/278

(58) Field of Classification Search
CPC .................................. H05B 1/02; G05D 23/00
USPC .......... 219/494, 497, 492, 507–509; 392/307; 700/278; 165/59
See application file for complete search history.

(56) References Cited

U.S. PATENT DOCUMENTS

| 4,271,899 | A | * | 6/1981 | Noland .......................... 165/233 |
| 4,346,755 | A | * | 8/1982 | Alley et al. ................... 165/231 |
| RE33,051 | E | * | 9/1989 | Ravin ..................... 123/142.5 R |
| 5,040,379 | A | | 8/1991 | Fukunaga et al. |
| 5,367,601 | A | * | 11/1994 | Hannabery ................... 392/307 |
| 6,149,066 | A | * | 11/2000 | Perry et al. .................... 237/2 B |

(Continued)

FOREIGN PATENT DOCUMENTS

| JP | 61-31739 | 2/1986 |
| JP | 2-116693 | 9/1990 |
| JP | 3-17973 | 2/1991 |
| JP | 5-299818 | 11/1993 |
| JP | 6-34976 | 5/1994 |
| JP | 8-16587 | 2/1996 |
| JP | 2696990 | 9/1997 |
| JP | 11-14257 | 1/1999 |
| JP | 2004-53032 | 2/2004 |
| JP | 2005-118093 | 5/2005 |
| JP | 2005-337532 | 12/2005 |
| JP | 2007-303756 | 11/2007 |
| JP | 2008-93578 | 4/2008 |

OTHER PUBLICATIONS

Japan Official Action, mail date is Nov. 20, 2012 and partial English language translation thereof.

*Primary Examiner* — Mark Paschall
(74) *Attorney, Agent, or Firm* — Greenblum & Bernstein P.L.C.

(57) ABSTRACT

A hot-air supplying method that includes: generating, by means of a heat pump, hot air that is at a temperature lower than a desired target hot-air temperature; subsequently heating, by a heater, the hot air having been generated by the heat pump, while controlling the heater the temperature adjuster so as to adjust the temperature of hot air thus heated to the target hot-air temperature. This makes it possible to supply, with reduced energy loss and at low costs, hot air for processing a work, the hot air being necessary in a factory where processing and assembly or the like are carried out. Further, temperature control accuracy is enhanced.

14 Claims, 8 Drawing Sheets

(56) References Cited

U.S. PATENT DOCUMENTS

| | | | |
|---|---|---|---|
| 6,176,306 B1* | 1/2001 | Gault | 165/240 |
| 8,309,894 B2* | 11/2012 | Zimmer et al. | 219/552 |
| 2010/0065245 A1* | 3/2010 | Imada et al. | 165/59 |
| 2010/0070093 A1* | 3/2010 | Harrod et al. | 700/278 |
| 2011/0218683 A1* | 9/2011 | Ben-Yaacov et al. | 700/278 |

\* cited by examiner

HOT-AIR SUPPLYING DEVICE AND HOT-AIR SUPPLYING METHOD HAVING BYPASS

TECHNICAL FIELD

The present invention relates to a hot-air supplying device and method for supplying, to various processing devices, hot air that is necessary for processing performed by the processing devices. The processing may be processing or inspecting a work. It will be understood that 'hot air' in the present invention denotes gas, such as air, that has been heated and the 'hot air' is not distinguished based on the temperature of the 'hot air'.

BACKGROUND ART

In general, a well-known hot air generating heater, which conducts heating by means of electricity, is used for supplying hot air to a processing device. However, the hot air generating heater uses a large amount of power because the hot air generating heater is used in such a manner that the hot air generating heater increases a temperature of gas directly from a room temperature to a desired temperature by resistance heating or induction heating of the gas. Further, starting-up of the hot air generating heater is not stable, because the heating to a target hot-air temperature is affected by a temperature of the gas to be heated.

A possible solution to the former problem is to use a heat pump, as in a clothes drying device as described in Patent Literature 1. The heat pump has been in widespread use in recent years due to its recognized ability to save energy as compared to direct heating. However, the use of the heat pump has a difficulty in attaining stable temperature control.

In this respect, Patent Literature 1 discloses that a temperature control is carried out by valving a flow path for $CO_2$ (cooling medium).

However, there is a concern that pressure of $CO_2$ may almost reach a pressure of 100 atm, because the $CO_2$ cooling medium in a supercritical state is used. Because of this, employing the mechanical control as described above in the processing device for a work ironically results in increased costs and also has a risk of a device failure, unless the mechanical control is employed in a large individual device such as the clothes drying device.

Further, stability at the time of start-up is not improved even in the case of using the heat pump, because the performance is affected by such a factor as a change in temperature of a low temperature-side heat source.

Still further, precise temperature setting is not easy in the heat pump. Therefore, the heat pump cannot be used for hot air supply for processing a work, the processing requiring strict temperature setting. Such processing that requires strict temperature setting is, for example, pre-molding drying of a metal hoop for use in insert molding for manufacturing an electronic component.

CITATION LIST

Patent Literature 1

Japanese Patent Application Publication, Tokukai, No. 2007-303756 A (Publication Date: Nov. 22, 2007)

SUMMARY OF INVENTION

Technical Problem

In view of the aforementioned problems, a primary object of the present invention is to make it possible to supply hot air with highly accurate temperature control, little energy loss, and low costs.

Solution to Problem

In order to attain the object, a hot-air supplying device according to the present invention is a hot-air supplying device for being provided to a processing device that processes a work, the hot-air supplying device including: a heat pump configured to generate hot air at a temperature lower than a target hot-air temperature necessary for the process; a heater configured to heat the hot air generated by the heat pump; and a temperature adjuster configured to control the heater so that the temperature of the hot air, generated by the heat pump, is further heated to adjust the generated hot air to the target hot-air temperature. The hot-air supplying device may further include a temperature reducer configured to lower the temperature of the generated hot air when the temperature of the generated hot air is higher than a predetermined temperature.

That is, the hot air at a temperature lower than a desired target hot-air temperature of hot air is generated by means of the heat pump, the hot air is subsequently heated so as to have an increased temperature, while the temperature adjuster adjusts the temperature of the hot air to the target hot-air temperature necessary for the processing. As the heater, means that carries out heating by means of electricity or vapor (including high-temperature vapor that is used, for example, for processing a work) may be used. Since the heater only has to increase the temperature of the hot air that has been obtained in advance to the target hot-air temperature, it is possible to reduce energy consumption. Further, since load on the heater is small, temperatures can be adjusted with better accuracy than that in a case where the heat pump is used alone. In addition, since the hot air that has been obtained in advance is heated, stability at the time of a start-up is better than that in the case where the heat pump is used alone.

The temperature of the hot air to be generated by means of the heat pump is preferably set to be in a range within which a faster response can be exhibited, based on a performance of the heater and how much an airflow of the hot air to be treated by the heater is.

The temperature controller may be controlled based on the temperature of the hot air having been heated by means of the heater and/or on the temperature of the hot air having been generated by means of the heat pump.

It is preferable that liquid be used as a low temperature-side heat source that enters the heat pump, which liquid has absorbed heat that has been generated in processing of a work in the processing device that uses the hot air produced in the hot-air supplying device, or in another processing device different from the processing device.

Coolant for the processing device or another processing device may be used as the low temperature-side heat source that enters the heat pump.

It is preferable that the heater be for being provided to a drying device configured to dry a hoop. The hoop is a long strip-shaped metal thin plate that is used for manufacturing an electronic component. Drying of the hoop requires strict temperature setting. In view of this, the heater can be suitably applied in such occasions as when the hoop having been pressed is washed and dried so as to be taken up, when the hoop having been plated is washed and dried, or when the hoop is washed and dried prior to being subject to insert molding. The present invention may of course employ a configuration in which a plurality of heaters are provided per one hot-air supplying device, some of the heaters are provided to a drying device for drying the hoop before processing of the molding device, and the other heaters are provided to a drying device for drying the hoop before processing of the reeler device.

Further, the hot-air supplying device may employ a configuration in which the low temperature-side heat source that enters the heat pump is coolant for cooling the molding device, and the heater is for being provided to a drying device configured to dry a hoop before processing of the molding device.

The use of heat that is generated in the same or a different processing device is efficient and the transfer of heat in the factory toward where the heat is needed makes it possible to keep good environment in the factory. Further, the use of the liquid or the coolant provides a large heat capacity and an excellent heat transfer performance and contributes to downsizing of the heat pump. In some cases, it is possible to omit a chiller that is conventionally used to cool the coolant.

Further, a sensor configured to measure a temperature of the low temperature-side heat source that enters the heat pump, a sensor configured to measure a temperature of suction air that enters the heat pump, and a controller configured to control the heat pump based on results of detection by the sensors may be provided. Even when there is a change in temperature of the low temperature-side heat source or the suction air, hot air at a stable temperature can be obtained by means of the heat pump. This makes it possible to stabilize a temperature of the hot air that is to be generated later with the heater.

In order to attain the object, a hot-air supplying method according to the present invention is a hot-air supplying method for supplying hot air to a processing device that process a work, the hot-air supplying method including: generating, with a heat pump, hot air that is at a temperature lower than a target hot-air temperature necessary for processing; and subsequently heating the hot air generated by the heat pump, while controlling a heater, which heats the generated hot air, with a temperature adjuster so that the temperature of the generated hot air is adjusted to the target hot-air temperature. Also in this method, it is preferable to lower the temperature of the generated hot air when the temperature of the hot air is higher than a predetermined temperature.

In the same manner as previously described, hot air that is at a temperature lower than the desired target hot-air temperature is generated with the heat pump, the hot air is subsequently heated with the heater so as to have an increased temperature, while the temperature adjuster adjusts the temperature of the hot air to be the target hot-air temperature necessary for the processing. Since the heater only has to increase the temperature of the hot air that has been obtained in advance to the target hot-air temperature, it is possible to reduce power consumption. Further, since load on the heater is small, temperatures can be adjusted with accuracy. In addition, since the hot air that has been obtained in advance is heated, good stability at the time of start-up is exhibited.

Advantageous Effects of Invention

As described above, the present invention allows hot air at a desired target hot-air temperature to be obtained with reduced energy loss. Further, since the temperature control is handled by the heater and the temperature adjuster, fine temperature control with a good response, and good temperature stability at the time of start-up are attained.

Additional objects, features, and strengths of the present invention will be made clear by the description below. Further, the advantages of the present invention will be evident from the following explanation in reference to the drawings.

DESCRIPTION OF EMBODIMENTS

The present invention will be described in further detail with reference to examples and comparative examples. It should be noted that the present invention is not limited to these examples and comparative examples.

In order to attain the object of supplying hot air with highly accurate temperature control, small energy loss, and low costs, provided is a hot-air supplying device having a configuration in which hot air at a temperature lower than a target hot-air temperature necessary for processing is generated by means of a heat pump, the hot air generated by means of the heat pump is subsequently heated by heating means controlled by temperature adjusting means so as to adjust the temperature of the hot air to the target hot-air temperature.

The hot-air supplying device according to the present invention is applicable to processing devices for carrying out various kinds of processing such as heating, drying, molding, curing, softening, inspecting or the like. In one embodiment to be described below, the hot-air supplying device according to the present invention is exemplified as one employed in a processing device which is installed in a factory and is used for processing a work for an electronic component or the like. More specifically, the processing device is exemplified as a washing and drying machine which is installed at a previous stage of an injection molding machine for injection molding synthetic resin so as to carry out insert molding for the purpose of manufacturing an electronic component, a continuous curing furnace which cures thermosetting resin that serves as a seal material for an electronic component, and a burn-in testing machine which inspects an electronic component.

The one embodiment of the present invention will be described below with reference to drawings.

First, a description will be given on a hot-air supplying device 11 which is provided to a washing and drying machine (see FIG. 1). Then, hot-air supplying devices 11 which are provided to the other processing devices will be sequentially described.

Figure 1:
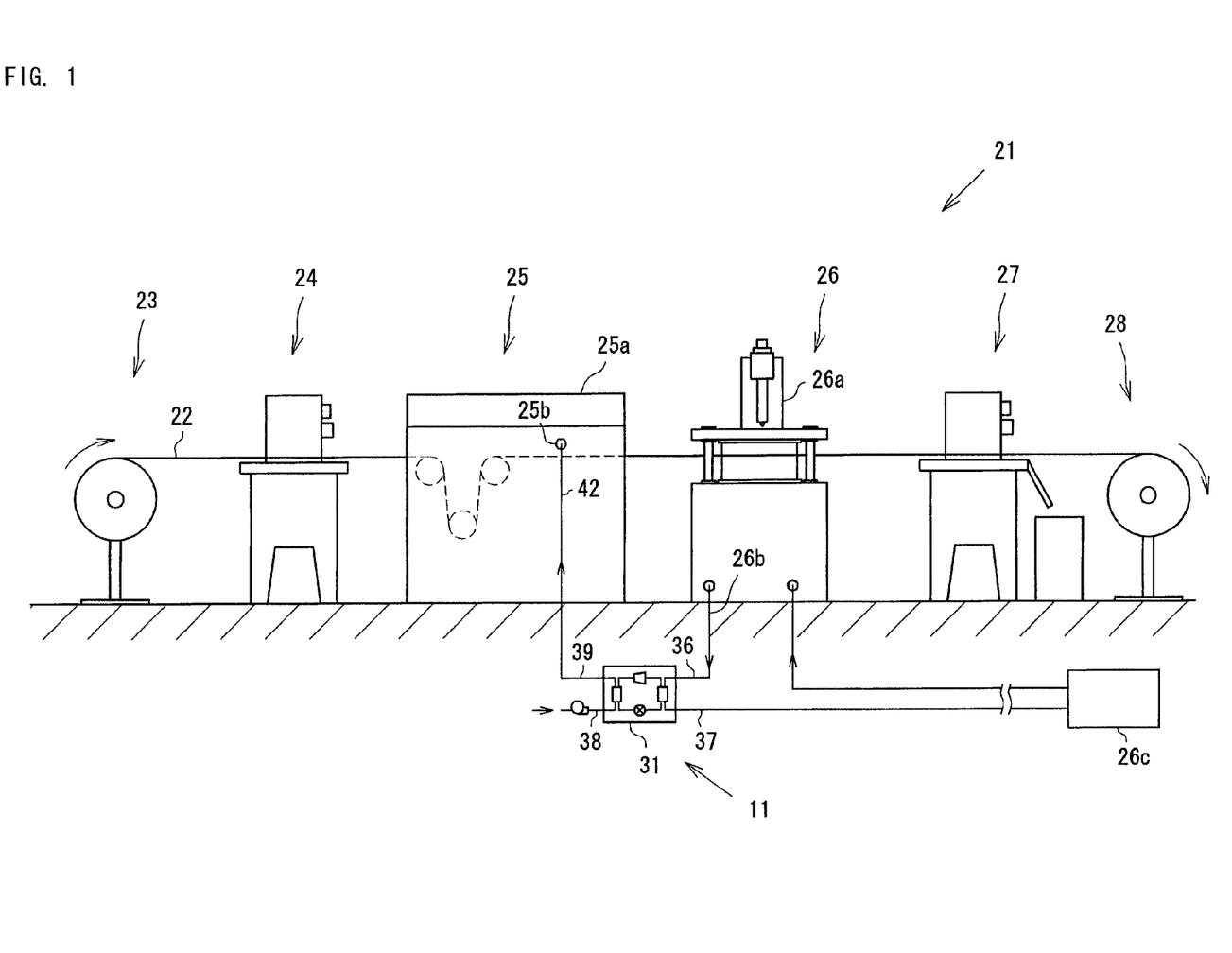
FIG. 1 is a view illustrating an entire structure of a manufacturing line including a hot-air supplying device.

FIG. 1 is a view illustrating an entire configuration of a manufacturing line 21 for manufacturing an electronic component, in which manufacturing line 21 insert molding is carried out. The manufacturing line 21 has, from an upstream thereof, a hoop supplying section 23 that supplies a hoop 22 (obtained by pressing a long strip-shaped metal thin plate), part of which is to be made into an insert part, a first pressing section 24 that presses the hoop 22 so as to carry out bending work immediately before molding, a washing and drying section 25 that washes and then dries the hoop 22 having been bent, a molding section 26 that carries out injection molding using, as an insert part, part of the hoop 22 having been washed and dried, a second pressing section 27 that removes a molded article from the hoop 22, and a reeler section 28 that takes up the hoop 22.

The hot-air supplying device 11 is used for supplying, to a washing and drying machine 25a of the washing and drying section 25, hot air for drying the hoop 22 as a work, and is provided between an injection molding machine 26a of the molding section 26 and the washing and drying machine 25a so as to make use of waste heat emitted from the injection molding machine 26a during the molding processing.

Figure 2:
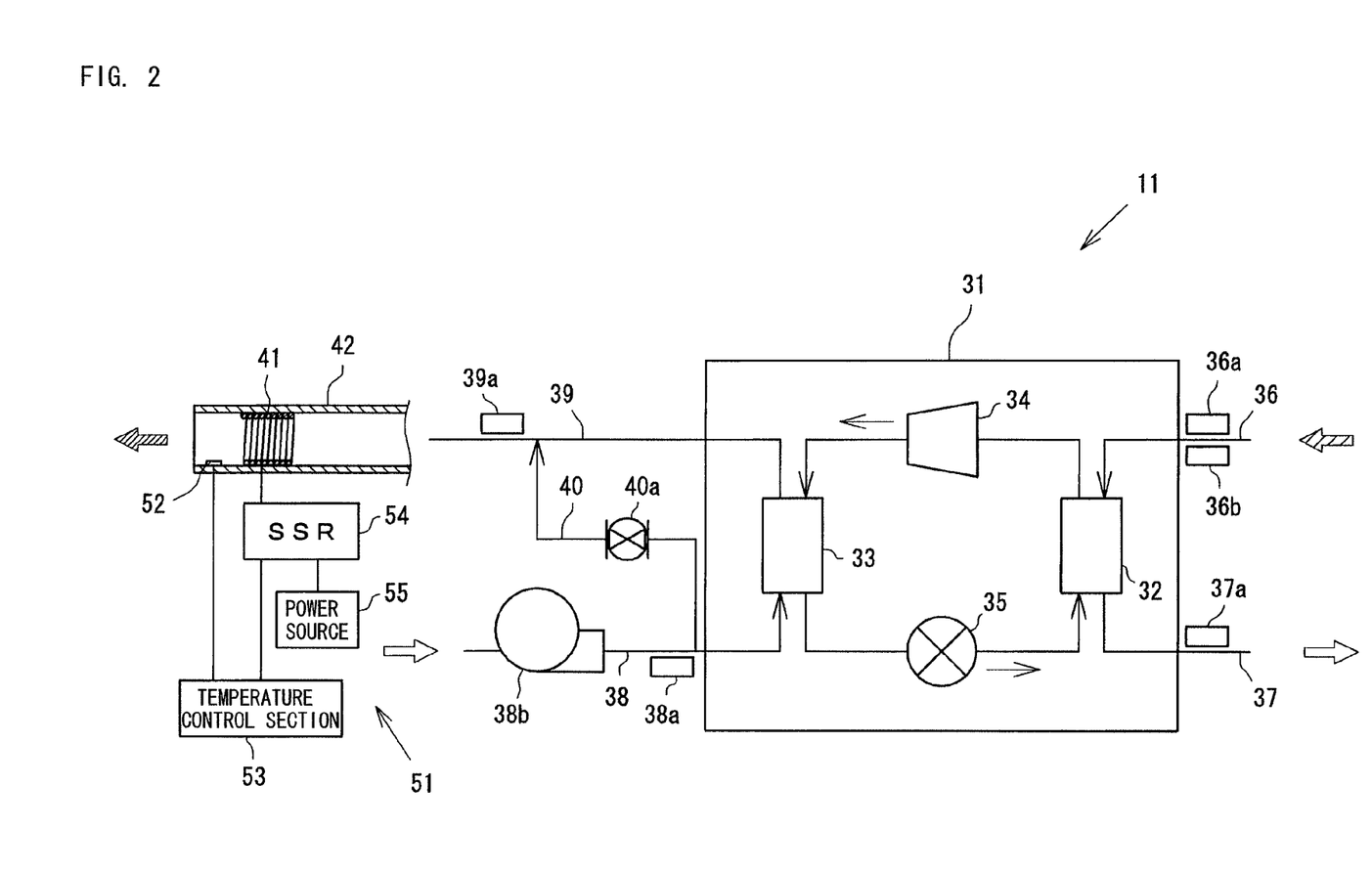
FIG. 2 is a block diagram illustrating an essential part.

The hot-air supplying device 11 has, as illustrated in FIG. 2, a heat pump 31 that generates hot air at a temperature lower than a target hot-air temperature needed to dry the hoop, a heater 41 that electrically heats the hot air generated by the heat pump 31, and temperature adjusting means 51 that adjusts the temperature of the hot air thus heated to the target hot-air temperature by controlling the heater 41.

The heat pump 31 includes, like a conventional heat pump, a heat absorber 32, a heat radiator 33, a compressor 34 and an expander 35. To make use of the waste heat from the injection molding machine 26a as described above, a coolant circulating to cool operating oil or a mechanism that are provided in the injection molding machine 26a is utilized as a low temperature-side heat source. That is, a low temperature-side heat source supply channel 36 is formed from part of a coolant circulation channel 26b (see FIG. 1) and connected to the heat absorber 32 of the heat pump 31. The coolant passes through the heat absorber 32 to thereby lose heat. Then, the coolant flows through a reflux channel 37 back to the circulation channel 26b. In FIG. 1, the reference numeral 26c denotes a chiller or cooling tower 26c for cooling the coolant.

The low temperature-side heat source supply channel 36 is provided with a coolant inlet-side temperature sensor 36a for measuring a temperature of the coolant and an inlet-side pressure tap 36b for measuring a flow rate of the coolant. The reflux channel 37 is provided with an outlet-side pressure tap 37a for measuring a flow rate of the coolant having passed through the heat absorber 32. A pressure difference is found based on results of detection by the inlet-side pressure tap 36b and the outlet-side pressure tap 37a, whereby data equivalent of a flow rate can be obtained.

The heat radiator 33 is connected with a suction path 38 for sucking in air (suction air) in the factory and with a preheated hot air supply path 39 for supplying hot air (hereinafter referred to as 'preheated hot air') having a heat energy that has been obtained through a heat exchange at the heat radiator 33. The suction path 38 is provided with a suction air temperature sensor 38a for measuring a temperature of the suction air. The preheated hot air supply path 39 is provided with a preheated hot air temperature sensor 39a for measuring a temperature of the preheated hot air. FIG. 2 illustrates a blower 38b, a bypass 40 as temperature lowering means, and an electric control valve 40a. The bypass 40 directly connects between the suction path 38 and the preheated hot air supply path 39 at a position in the upstream of the heater 41 so as to introduce the suction air from the suction path 38 to this position, to thereby lower the temperature of the preheated hot air on an unwanted occasion where the preheated hot air is overheated. The electric control valve 40a opens the bypass 40 based on results of detection by the preheated hot air temperature sensor 39a and the suction air temperature sensor 38a. The control by the electric control valve 40a can be carried out in the same manner as the temperature adjusting means 51.

Figure 3:
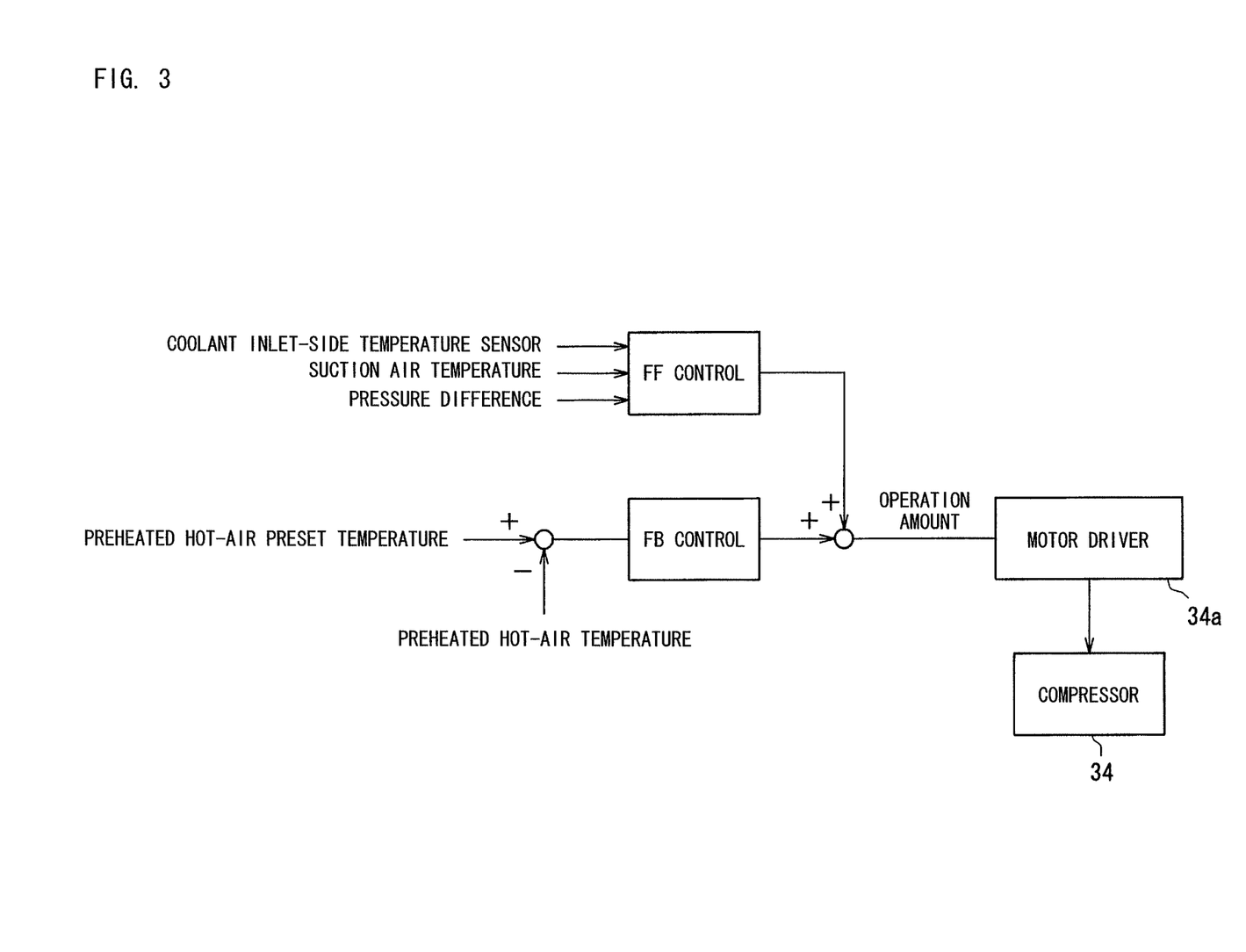
FIG. 3 is a conceptual diagram of control in a heat pump.

The temperature detected by the coolant inlet-side temperature sensor 36a, the temperature detected by the suction air temperature sensor 38a, the pressure difference obtained from the inlet-side pressure tap 36b and the outlet-side pressure tap 37a, and the temperature detected by the preheated hot air temperature sensor 39a are used in control of driving the compressor 34 of the heat pump 31, as shown in the conceptual diagram of FIG. 3.

The control of the driving of the compressor 34 will be described below. The control of the driving of the compressor 34 is carried out by combined use of feedforward control (hereinafter referred to as 'FF control') and feedback control (hereinafter referred to as 'FB control').

That is, the compressor 34 is driven by means of the FF control in addition to the FB control. In the FB control, a temperature difference is calculated by a temperature control meter based on the preheated hot air temperature detected by the preheated hot air temperature sensor 39a and a preheated hot air setting temperature that is preset at the temperature control meter. Then, based on the result of calculation (i.e., the temperature difference), an amount of power to be supplied to a motor driver 34a of the compressor 34 is calculated. The result of this calculation is outputted from the temperature control meter. In the FF control, an amount of power (correction amount) to be supplied to the motor driver 34a is determined based on the temperature (coolant inlet-side temperature) detected by the coolant inlet-side temperature sensor 36a, the temperature (suction air temperature) detected by the suction air temperature sensor 38a, and the pressure difference obtained from the inlet-side pressure tap 36b and the outlet-side pressure tap 37a, and the determined amount is outputted.

As an electric power handler like the motor driver 34a, well-known means such as an inverter is used. PID control is employed in the determination of the corrected amount in the FB control.

According to the above-described control, in a case where the temperature or flow rate of the coolant changes due to a change in a state of the injection molding machine 26a or the like, or the temperature of the suction air changes, the correction is carried out by means of the FF control prior to the FB control in which the temperature of the preheated hot air is adjusted by controlling the driving of the compressor 34 based on the temperature of the preheated hot air generated in the heat pump 31. That is, the correction is carried out before an influence is observed as a disturbance in temperature. This makes it possible to more certainly stabilize the temperature of the preheated hot air.

Further, the above-described control is advantageous in that carrying out the FF control allows simpler and more reliable arithmetic operation control as compared to a case where only the FB control is carried out and PID control is carried out after an influence is observed as a disturbance in temperature of the preheated hot air. Also, carrying out the above-described control at the stage of generating the preheated hot air allows very simple and stable temperature control as compared to a case where the FB control is carried out after generation of hot air by heating the preheated hot air.

Note that the present embodiment may employ adjustment of an aperture of an expansion valve of the expander 35 instead of the control of the driving of the compressor 34. The present embodiment may also employ control of the driving of both the compressor 34 and the expander 35.

To give an additional explanation on the temperature of the preheated hot air to be generated by means of the heat pump 31 (i.e., the preheated hot air target hot-air temperature), it is preferable that the temperature of the preheated hot air be set to be in a range within which a faster response can be exhibited, based on factors such as how much heat the heater 41 outputs, and how much an airflow of the preheated hot air to be treated by the heater 41 is.

Specifically, in a case of hot air for the above-described hoop drying, if a temperature (hot air temperature) of the hot air for the drying of a hoop is set, for example, to 80° C., a temperature (preheated hot-air temperature) of the preheated hot air is set, for example, to about 75° C. The preheated hot-air temperature can be set taking into account accuracy in temperature control by the heat pump 31. In a case where the accuracy in the temperature control by the heat pump 31 has an allowance of about, for example, ±2 K, the preheated hot-air temperature can be set to a temperature about 5 K lower than the hot air temperature.

In a case where the preheated hot air is at 75° C., a hot-air supplying path has a diameter of φ50 mm, the flow rate is about 2.8 m³/min, and a heater with a capacity of 400 W is used, a temperature increase of about 5 K can be immediately accomplished even if the operation is carried out by temperature control at a duty cycle of about 60%.

As illustrated in FIG. 2, the preheated hot air supply path 39 leads to a hot-air supplying path 42, the preheated hot air supply path 39 outputting the preheated hot air generated by means of the heat pump 31 as described above. The hot-air supplying path 42 is for supplying the hot air to a hot-air supplying section 25*b* of the washing and drying machine 25*a* (see FIG. 1) by having a leading end connected to the hot-air supplying section 25*b* of the washing and drying machine 25*a*. The hot-air supplying path 42 has the heater 41 in a portion near the leading end side thereof. The heater 41 heats the preheated hot air passing through the hot-air supplying path 42. The heater 41 is provided with the temperature adjusting means 51, whereby a temperature of the hot air passing through the heater 41 is adjusted to a target hot-air temperature.

The temperature adjusting means 51 is constituted by a hot-air temperature sensor 52, a temperature control section 53, an SSR 54, and a power source 55. In the hot-air supplying path 42, the hot-air temperature sensor 52 is provided somewhere between the leading end and the position where the heater 41 is provided, and measures the temperature of the hot air having passed through the heater 41. The temperature control section 53 calculates a temperature difference based on (i) the hot air temperature detected by the hot-air temperature sensor 52 and (ii) a target hot-air temperature that has been preset, and outputs an operation amount to the SSR 54 based on the calculation result (temperature difference). The SSR 54 is an electric power adjustor that switches on and off power to the heater 41. The power source 55 supplies power to the SSR 54.

That is, the SSR 54 is turned on so that the heater 41 generates heat until the hot-air temperature sensor 52 detects that the temperature of the hot air having passed through the heater reaches the target hot-air temperature that has been preset by the temperature control section 53. When the temperature detected by the hot-air temperature sensor 52 reaches the target hot-air temperature, the SSR 54 is turned off so that the heater 41 stops generating heat. In other words, a closed-loop control is carried out in which temperature measurement by the hot-air temperature sensor 52 is carried out, control computation is carried out by the temperature control section 53, and an operation amount (operation output value) for the SSR 54 is outputted. When the temperature of the hot air having passed through the heater 41 changes, the temperature change is fed back.

Carrying out the FB control in this manner allows an immediate and proper correction even under disturbance, so that hot air at a target hot-air temperature is obtained. Further, it is also possible to improve response to the target hot-air temperature by arranging that the setting by the temperature control section 53 is determined in consideration of the temperature of the preheated hot air.

Figure 4:
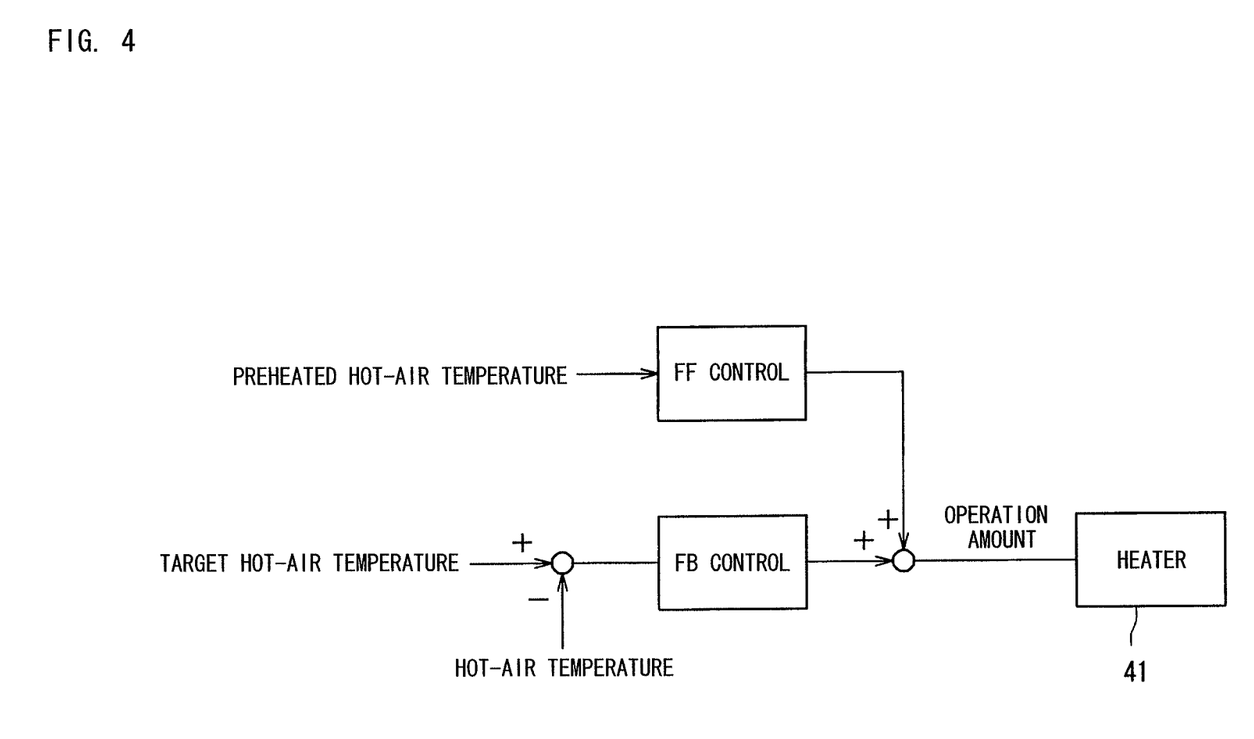
FIG. 4 is a conceptual diagram of control by temperature adjusting means.

In addition to the above-described FB control, it is also possible to carry out the FF control based on the preheated hot-air temperature, as shown in FIG. 4, the conceptual diagram of control. By carrying out the FF control also in the temperature control of the hot air generated by being heated by the heater 41, it becomes possible to handle an unexpected disturbance, which cannot be completely handled by the FB control alone. This allows fine temperature adjustment to be conducted more precisely.

When the injection molding machine 26*a*, the heat pump 31, and the heater 41 are driven, the hot-air supplying device 11 having the above-described configuration collects waste heat from the coolant in the injection molding machine 26*a*, gives the waste heat to suction air introduced to the heat pump 31, and generates preheated hot air at a temperature as preset. The heater 41, which is provided in the hot-air supplying path 42, heats the generated preheated hot air up to a target hot air temperature under the control of the temperature adjusting means 51, whereby the hot-air supplying device 11 supplies the temperature-adjusted hot air to the washing and drying machine 25*a*. The hot air supplied into the washing and drying machine 25*a* is blown to the hoop 22 (a work to be treated) being still wet after washing, whereby the hoop drying is carried out.

Since the temperature of the hot air has been appropriately adjusted as described above, the hoop drying can be carried out with no concern that the hot air damages the hoop 22. Further, defection can be reduced at the later stage of injection molding.

Also, since the hot air is obtained through the heating of the preheated hot air, it is possible to reduce power consumed by the heater 41 as compared to a case where air at a room temperature is heated up to a target hot-air temperature. Further, this reduces load on the heater 41. In addition, since the temperature is adjusted through the driving of the heater 41, hot air at a desired temperature is obtained with accuracy through a proper control. Also, even if the process requires hot air at a temperature that is impossible to obtain by means of the heat pump 31 alone, the hot air at such a temperature can be obtained quickly at low costs. Since the hot air is generated through the heating of preheated hot air that has been obtained in advance, good stability at the time of start-up is exhibited.

The bypass 40 is provided between the preheated hot air supply path 39 and the suction path 38 so as to allow the temperature of the preheated hot air to be instantly lowered by means of introduction of the suction air in the suction path 38 through the bypass 40 when the preheated hot air is overheated to exceed the predetermined temperature. Because of this, it is ensured that hot air at a desired temperature can be obtained with accuracy.

Further, since the coolant for cooling the heat generated in the injection molding machine 26*a* that is arranged in the same manufacturing line 21 is used as the low temperature-side heat source to be supplied into the heat pump 31, it is possible to make efficient use of the waste heat. In addition, since the generated hot air is transferred to the washing and drying machine 25*a* that is located nearby, it is also possible to reduce heat energy loss. Further, since the heat in the factory is made use of by transferring the heat to where the heat is needed, the present embodiment also contributes to keeping good environment in the factory. Also, the chiller 26*c* that is conventionally needed to cool the coolant can be omitted.

In addition, since the coolant having a large heat capacity and an excellent heat transfer performance is used as the low temperature-side heat source, it is possible to downsize the heat pump 31 and accordingly the hot-air supplying device 11. Also, applicability to an existing processing device such as the washing and drying machine 25*a* can be enhanced.

Figure 5:
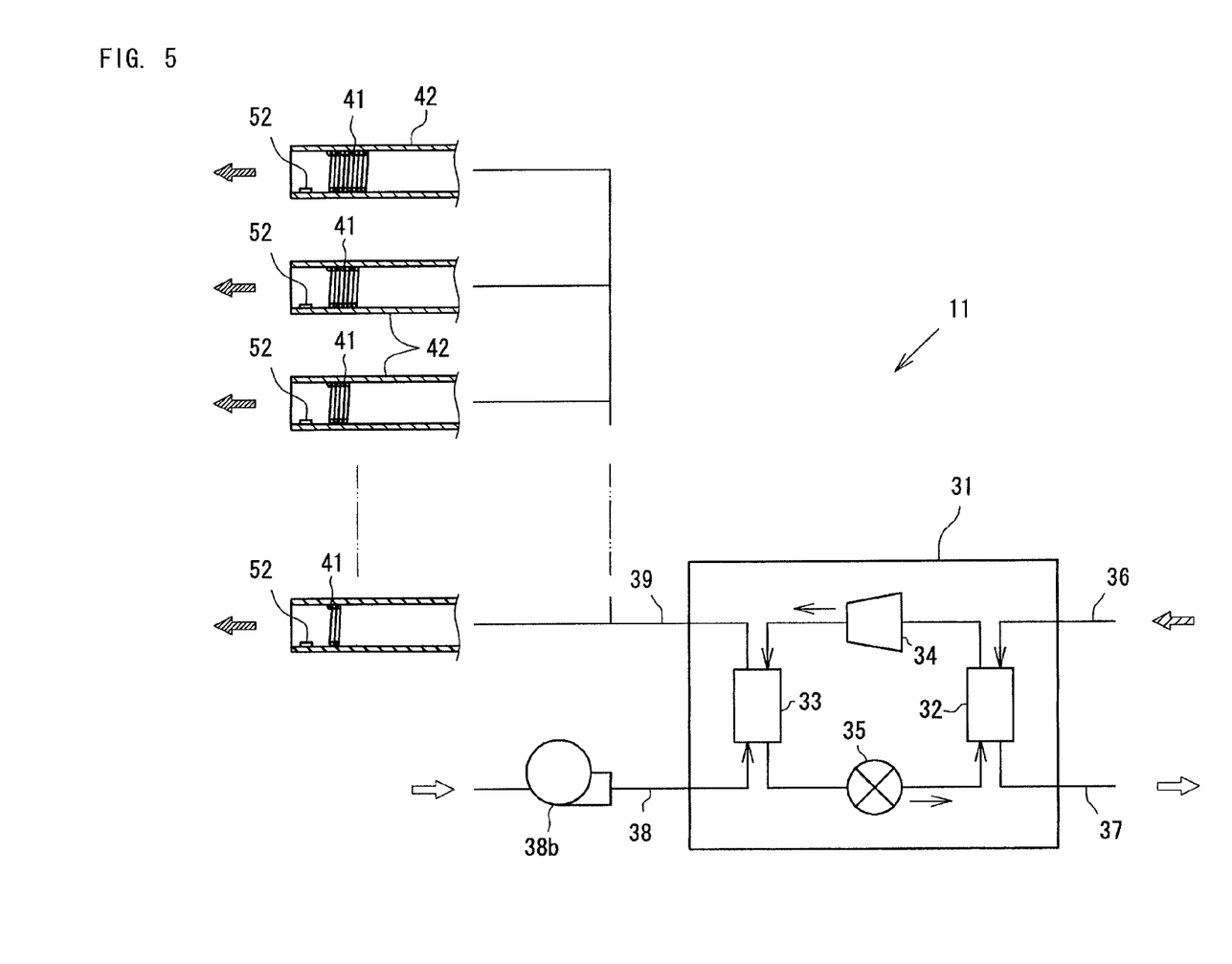
FIG. 5 is a block diagram illustrating another example of the hot-air supplying device.

Although the description above does not mention how many hot-air supplying path 42 is provided, it will be understood that the hot-air supplying path 42 may be provided in plurality as illustrated in FIG. 5. In other words, the hot-air supplying path 42 may be bifurcated. The plurality of hot-air supplying paths 42 are appropriately connected with portions of a processing device, which portions utilize the hot air, or with the processing device(s) utilizing the hot air.

At this time, as illustrated in FIG. 5, by employing a configuration in which the heater 41 for heating the preheated hot air is provided in each of the hot-air supplying paths 42 in such a manner that the capacities of the heaters 41 are different from one another, it becomes possible to easily obtain hot air at different temperatures from the preheated hot air at the same temperature. This increases versatility.

The hot-air supplying path 42, if constituted by a hose, can be led to a place far away, let alone to the nearby position as described above. With this configuration, a hot-air supplying device (not shown) for supplying hot air, for example, to a manufacturing line (not shown) for manufacturing a hoop to be provided to the hoop supplying section 23 in the manufacturing line 21 can be constituted by utilizing, as the low-temperature side heat source, the coolant or the like that is generated, for example, in the manufacturing line 21 for manufacturing an electronic component by performing the insert molding as described above.

The hoop is manufactured by pressing a long strip-shaped metal thin plate into a desired shape. After this, the hoop is washed and dried so as to remove stains that were given at the time of pressing. The hoop thus washed and dried is taken up by a reeler device (not shown). A drying section of a washing and drying machine for washing and drying the hoop dries the hoop by blowing hot air to the hoop having been washed, in the same manner as the above-described washing and drying machine 25*a*. Therefore, the hot-air supplying device can be constituted by connecting the hot-air supplying path to the drying section of the washing and drying machine and providing the heater as heating means to the hot-air supplying path. Coolant in a press molding machine that carries out press work may also be used as the low temperature-side heat source.

A hot-air supplying device for supplying hot air to a drying section of a washing and drying machine that washes and dries a hoop after plating treatment (such as pre-plating and plating) can be constituted in the same manner.

In order to provide hot air to a place away from the low temperature-side heat source as described above, it is preferable that the low temperature-side heat source supply channel 36 be constituted by a hose so as to be made long in length, rather than making the hot-air supplying path 42 long in length. This is because the low temperature-side heat source supply channel 36 can be constituted by a hose much thinner than that for the hot-air supplying path 42 that feeds air, meanwhile the low temperature-side heat source is liquid. This contributes to a compact configuration of the device or the like.

Figure 6:
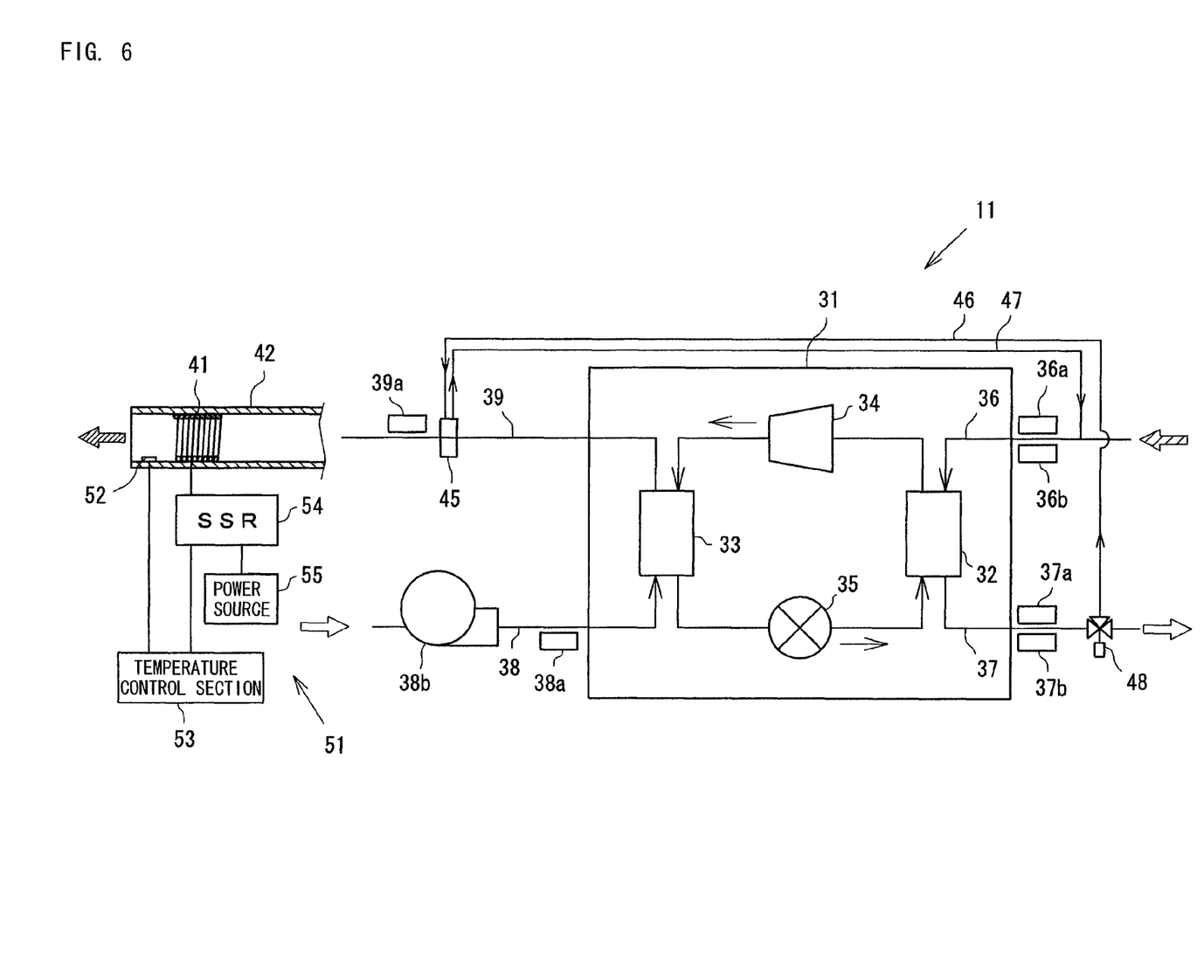
FIG. 6 is a block diagram illustrating an essential part of the another example.

In the previously-described example, the temperature lowering means for lowering the temperature of the overheated preheated hot air is the bypass 40, but may be any other appropriate means. For example, as illustrated in FIG. 6, a heat exchanger 45 to which the coolant from the reflux channel 37 of the heat pump 31 is guided can be used to constitute the temperature lowering means. Specifically, the heat exchanger 45 is provided in the hot-air supplying path 42 at a position in the upstream of the heater 41 in such a manner that the heat exchanger 45 is exposed to the flow of the preheated hot air. The heat exchanger 45 is connected with an introduction channel 46 that comes in from the reflux channel 37 and with a lead-out channel 47 that goes out to the lower temperature-side heat source supply channel 36. A three-way switching valve 48 is provided between the reflux channel 37 and the introduction channel. The opening and closing of the three-way switching valve 48 is controlled based on results of detection by the preheated hot air temperature sensor 39*a* and a coolant outlet-side temperature sensor 37*b*. The three-way switching valve 48 can be controlled in the same manner as the temperature adjusting means 51.

In a case where the temperature of the preheated hot air increases to exceed a predetermined temperature, the three-way switching valve 48 is driven to cause the low-temperature coolant, which passes through the reflux channel 37, to flow into the hot-air supplying path 42 so as to exchange heat, whereby the excessively increased temperature of the preheated hot air can be lowered. Since the three-way switching valve 48 causes the low-temperature coolant to flow into the heat exchanger 45 based on the results of detection by the sensors 39*a* and 37*b*, the temperature of the overheated preheated hot air can be lowered. Thus, it can be certainly achieved that hot air at a desired temperature can be obtained with accuracy.

In the above-described examples, the low temperature-side heat source that enters the heat pump 31 of the hot-air supplying device 11 is coolant that has absorbed heat generated in processing of a work in the injection molding machine 26*a* that is different from the washing and drying machine 25*a* that uses generated hot air. It should be noted, however, that it is also possible to use, as the low temperature-side heat source fluid, fluid that has absorbed heat generated in processing of a work in the same processing device that uses hot air to be generated.

Figure 7:
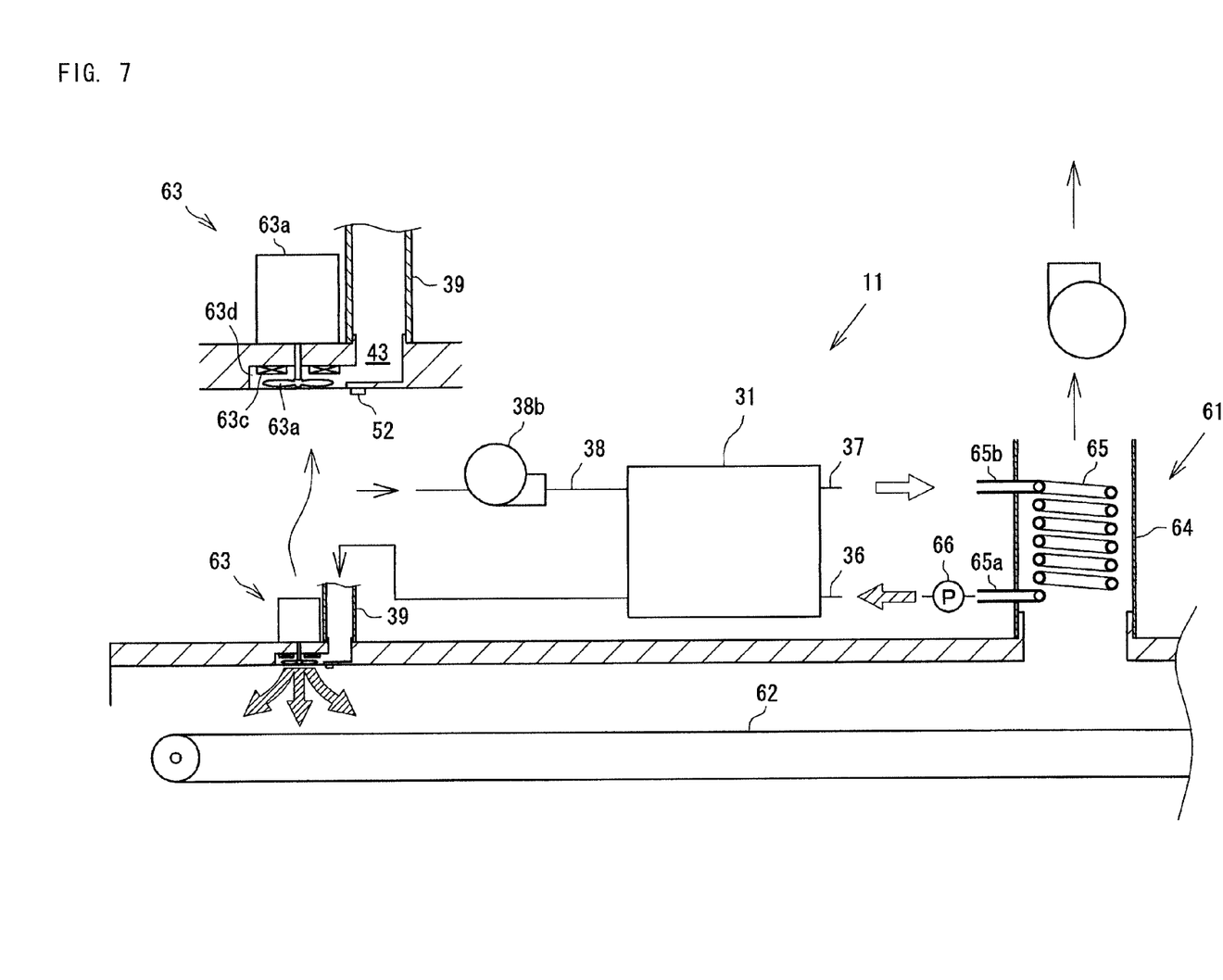
FIG. 7 is a block diagram illustrating an essential part of a continuous curing furnace including the hot-air supplying device.

This is exemplified in FIG. 7, in which the hot-air supplying device 11 is included in a continuous curing furnace 61. That is, the continuous curing furnace 61 as a processing device carries a work that is placed on a carrying path 62 into the furnace and cures thermosetting resin that has been applied to the work while the work was being carried. The continuous curing furnace 61 is used, for example, for curing a sealing portion of a bottom of a relay.

Hot air is blown into the furnace from a hot-air generating section 63 at a ceiling portion, and gas generated during the curing reaction is discharged through a duct 64 provided at the ceiling portion. Hot air containing gas is discharged from the duct 64. The hot-air generating section 63 includes a fan 63b that rotates by means of a motor 63a and a heater 63c located behind the fan 63b.

Due to this, the hot-air supplying device 11 is provided between the duct 64 and the hot-air generating section 63.

The heat pump 31 and the temperature adjusting means 51 of the hot-air supplying device 11 respectively have similar configurations as those described above. The like reference number will be given to a similar portion as a portion described in the heat pump 31 and the temperature adjusting means 51, and descriptions on such portion will be omitted.

Fluid having absorbed heat obtained from the discharge air in the duct 64 is used as the low temperature-side heat source for the heat pump 31, as described above. Due to this, a heat absorbing pipe 65 having cooling medium such as water is provided in the duct 64. The heat absorbing pipe 65 is bent in a spiral manner so as to have a large surface area.

One end 65a of the heat absorbing pipe 65 is connected with a pump 66, the end of which is connected with the low temperature-side heat source supply channel 36 for the heat pump 31. The reflux channel 37 of the heat pump 31 is connected with the other end 65b of the heat absorbing pipe 65. This allows the cooling medium in the heat absorbing pipe 65 to circulate between the heat pump 31 and the duct 64.

The preheated hot air supply path 39 is connected with a communication path 43 that communicates with a space 63d in the hot-air generating section 63, the space 63d having the heater 63c therein. The communication path 43 corresponds to the hot-air supplying path 42 in the previous examples. A hot-air temperature sensor 52 is provided at a portion where hot air having been heated at the heater 63c comes out. Since the preheated hot air is heated by use of the heater 63c of the hot-air generating section 63 of the continuous drying furnace 61 as described above, there is no need of providing a heater in the preheated hot air supply path 39 or the communication path 43.

In a similar manner as the previous example, sensors provided in the respective sections can be used to control the temperatures of the preheated hot air or the hot air. In the present example, it is preferable to use a flow rate of the cooling medium in the heat absorbing pipe 65 or a temperature of the exhaust air in the duct 64.

In the hot-air supplying device 11 having the above-described configuration, the preheated hot air is generated by means of the heat pump 31 based on waste heat of the air discharged through the duct 64, and the preheated hot air thus generated is heated by means of the heater 63c, so as obtain hot air at a desired temperature. Thus, the same advantageous effect as those attained in the previous examples can be attained.

The continuous curing furnace 61 is provided with a cooling section (not shown) that causes heat to be dissipated from the heated work. The waste heat may also be collected from the cooling section in a similar manner as the heat absorbing pipe 65.

In place of the heat absorbing pipe 65, a well-known heat pipe (not shown), in which operating fluid repeatedly undergoes evaporation and condensation, is used to collect the waste heat. That is, a heat receiving section of the heat pipe is contained in the duct 64, and heat from a heat releasing section of the heat pipe is used as the low temperature-side heat source for the heat pump 31. In this case, an efficient heat transport is achieved due to a fast heat transfer. Further, use of the heat pipe allows heat to be collected without being wasted, because the heat pipe can be appropriately mounted to various portions having heat in a device such as the continuous thermal curing furnace 61.

Figure 8:
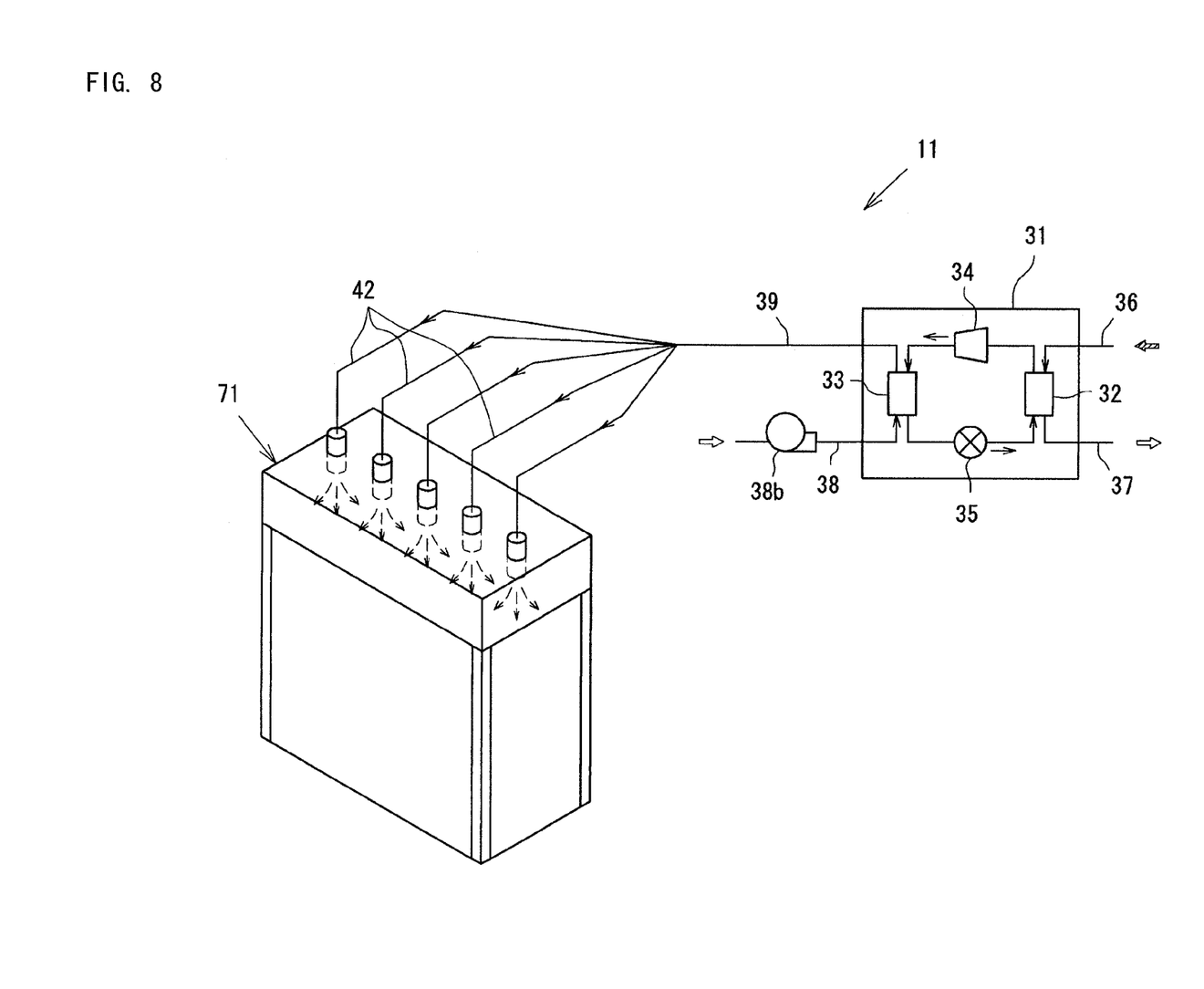
FIG. 8 is a view illustrating an essential part of a burn-in testing device including the hot-air supplying device.

FIG. 8 is a view illustrating the hot-air supplying device 11 that supplies hot air by making use of heat generated in another processing device. The hot-air supplying device 11 is provided in a burn-in testing machine 71 for inspecting a product. Waste heat from an appropriate processing device such as the injection molding machine 26a or the continuous curing furnace 61 as described above can be readily used as the low temperature-side heat source for the heat pump 31. In the description of this example, too, the like reference number will be given to a similar portion as a portion described in the previous configurations, and detailed descriptions on such portion will be omitted.

In the burn-in testing machine 71, hot air is fed from a ceiling portion. Because of this, the hot-air supplying path 42 is connected to the ceiling portion. The burn-in testing machine 71 as illustrated in FIG. 8 is shaped in a rectangular parallelepiped and has a rectangular shape in a plan view. Because of this, a plurality of hot-air supplying paths 42 are provided to the ceiling portion in such a manner that the plurality of hot-air supplying paths 42 are provided along a longitudinal direction. This makes it possible to supply hot air uniformly with a simple configuration.

In the hot-air supplying device 11 having the above-described configuration, the waste heat from other processing device is utilized by means of the heat pump 31 so as to generate the preheated hot air, and the preheated hot air thus generated is heated by means of a heater (not shown), so as obtain hot air at a desired temperature. Thus, the same advantageous effect as those attained in the previous examples can be attained.

Conventionally, the burn-in testing machine 71 of a type as illustrated in FIG. 8 uses a large amount of electricity because hot air at approximately 80° C. is directly produced through heating by means of a simple heating wire during the long-hours of testing. In the burn-in testing machine 71 according to the present invention, it is possible to reduce electric power cost and consequently generation of greenhouse gas resulting from the power consumption.

A relation between the configuration of the present invention and the embodiment as described above is as follows. The processing device according to the present invention corresponds to the washing and drying machine 25a and the injection molding machine 26a in the manufacturing line 21 for manufacturing the electronic component, in which manufacturing line 21 insert molding is carried out, and the press molding machine and the washing and drying machine in the manufacturing line for manufacturing a hoop, the continuous curing furnace 61, the burn-in testing machine 71 or the like. Likewise, the hot air at a temperature lower than a desired target hot-air temperature of hot air corresponds to the preheated hot air or the like. The heating means corresponds to the heaters 41 and 63c or the like. The temperature lowering means corresponds to the bypass 40, the heat exchanger 45 or the like. The liquid corresponds to the coolant, the cooling medium in the heat absorbing pipe 65 or the like. The drying device corresponds to the washing and drying machine 25a in the manufacturing line 21 for manufacturing an electronic component, in which manufacturing line 21 insert molding is carried out, the washing and drying machine in the manufacturing line for manufacturing a hoop, or the like. The sensor for measuring a temperature of the low temperature-side heat source corresponds to the coolant inlet-side temperature sensor 36a or the like. The sensor for measuring a temperature of the suction air corresponds to the suction air temperature sensor 38a or the like. The control section for controlling the heat pump corresponds to the FF control or the like. However, it should be noted that the present invention is not limited to the above-described configuration but may employ other embodiments.

For example, for the low temperature-side heat source for the heat pump, existing coolant that circulates in the factory may be used, instead of using waste heat generated in the processing device for processing a work. In summer, for example, heat can be absorbed from a cooling tower installed outside the factory. Even in other seasons, the circulating coolant absorbs heat from mechanical devices and pipes at respective sections, thereby making it possible to make sufficient use of heat by means of the heat pump.

Further, external air or the like may be used as the low temperature-side heat source. It is preferable that heat be collected from a roof (folded-plate roof) of the factory that is heated by being irradiated with sunlight or a ceiling portion of the factory, the ceiling portion being heated with heat in the factory, and the collected heat be used as the low temperature-side heat source of the heat pump. Alternatively, a generally-used solar water heater may be installed on the roof of the factory so as to be used as the low temperature-side heat source.

The heating means may be configured by something other than the electrically-driven heater. For example, the heating means may use vapor or hot air or the like. In the case of using vapor or hot air, simply using vapor or hot air that is used or inevitably generated in the factory makes it possible to make further more efficient use of energy.

The suction air may be gas other than air, for example, nitrogen gas. The suction air may even be hot air that has been supplied and used in processing such as drying.

INDUSTRIAL APPLICABILITY

The present invention allows hot air at a desired target hot-air temperature to be obtained with reduced energy loss, enables fine temperature control with a good response, and provides good temperature stability at the time of start-up. Therefore, the present invention is readily applicable to the hot-air supplying device or the like that is provided in the processing device for processing a work.

REFERENCE SIGNS LIST

11: hot-air supplying device
22: hoop
25a: washing and drying machine
26a: injection molding machine
31: heat pump
36a: coolant inlet-side temperature sensor
38a: suction air temperature sensor
40: bypass
41, 63c: heater
45: heat exchanger
51: temperature adjusting means
61: continuous curing furnace
71: burn-in testing machine

The invention claimed is:

1. A hot-air supplying device for a processing device that processes a work, the hot-air supplying device comprising:
 a heat pump configured to generate hot air at a temperature lower than a target hot-air temperature necessary for the process, the heat pump being connected to both a suction path to suck air into the heat pump and a preheated hot air supply path;
 a heater configured to heat the hot air generated by the heat pump and supplied by the preheated hot air supply path;
 a temperature adjuster configured to control the heater so that the temperature of the hot air, generated by the heat pump, is further heated to adjust the generated hot air to the target hot-air temperature; and
 a bypass that directly connects the suction path and the preheated hot air supply path such that air from the suction path is directly introducible into the preheated hot air supply path.

2. The hot-air supplying device of claim 1, wherein the heater electrically heats the generated hot air.

3. The hot-air supplying device of claim 1, wherein the bypass provides a temperature reducer configured to lower the temperature of the generated hot air when the temperature of the generated hot air is higher than a predetermined temperature by opening the bypass.

4. The hot-air supplying device of claim 1, wherein a low temperature-side heat source that enters the heat pump is liquid that has absorbed heat that has been generated in processing of a work in the processing device that uses the hot air produced in the hot-air supplying device, or in another processing device different from the processing device.

5. The hot-air supplying device of claim 1, wherein a low temperature-side heat source that enters the heat pump is coolant for the processing device or another processing device.

6. The hot-air supplying device of claim 1, wherein the heater is for being provided to a drying device configured to dry a hoop.

7. The hot-air supplying device of claim 1, wherein a low temperature-side heat source that enters the heat pump is coolant for cooling a molding device, and the heater is for being provided to a drying device configured to dry a hoop before processing of the hoop by the molding device.

8. The hot-air supplying device of claim 1, further comprising:
 a sensor configured to measure a temperature of a low temperature-side heat source that enters the heat pump;
 a sensor configured to measure a temperature of suction air that enters the heat pump; and
 a controller configured to control the heat pump based on results of detection by the sensors.

9. The hot-air supplying device of claim 2, wherein the bypass provides a temperature reducer configured to lower the temperature of the generated hot air when the temperature of the generated hot air is higher than a predetermined temperature by opening the bypass.

10. The hot-air supplying device of claim 3, further comprising a control valve configured to open the bypass based upon detection results of a preheated hot air temperature sensor that measures a temperature of preheated hot air and a suction air temperature sensor that measures a temperature of suction air.

11. The hot-air supplying device of claim 9, further comprising a control valve configured to open the bypass based upon detection results of a preheated hot air temperature sensor that measures a temperature of preheated hot air and a suction air temperature sensor that measures a temperature of suction air.

12. A hot-air supplying method for supplying hot air to a processing device that process a work, the hot-air supplying method comprising:

generating, with a heat pump, hot air at a temperature lower than a target hot-air temperature necessary for processing;

connecting the heat pump to a suction path to suck in air and a preheated hot air supply path;

subsequently heating the hot air generated by the heat pump and supplied by the preheated hot air supply path, while controlling a heater, which heats the generated hot air, with a temperature adjuster so that the temperature of the generated hot air is adjusted to the target hot-air temperature; and connecting the suction path and the preheated hot air supply path via a bypass so that air from the suction path is directly introducible into the preheated hot air supply path.

13. The hot-air supplying method of claim 12, further comprising lowering the temperature of the generated hot air, by opening the bypass, when the temperature of the generated hot air is higher than a predetermined temperature.

14. The hot-air supplying method of claim 12, further comprising providing a control valve to open the bypass based upon a temperature of preheated hot air measured by a preheated hot air temperature sensor and temperature of suction air measured by a suction air temperature sensor.

* * * * *